United States Patent [19]

Sharpe

[11] Patent Number: 4,973,795
[45] Date of Patent: Nov. 27, 1990

[54] TEMPORARY TRANSMISSION HOT LINE CROSSARM AND METHOD OF REPLACING TRANSMISSION HOT LINE CROSSARMS

[76] Inventor: Robert F. Sharpe, 2141 Fort Rice St., Petersburg, Va. 23805

[21] Appl. No.: 433,918

[22] Filed: Nov. 9, 1989

[51] Int. Cl.⁵ .................. H02G 1/02; H02G 7/05
[52] U.S. Cl. .................. 174/40 R; 29/402.08; 248/58; 254/393; 294/81.56
[58] Field of Search .................. 174/40 R, 43, 45 R, 174/149 R; 29/402.01, 402.03, 402.04, 402.08; 52/40, 697; 248/49, 58, 63; 254/134.3 R, 134.3 PA, 393; 294/81.56

[56] References Cited

U.S. PATENT DOCUMENTS

| | | | |
|---|---|---|---|
| 787,839 | 4/1905 | Ernst | 254/134.3 PA X |
| 1,793,733 | 2/1931 | Bodendieck | 174/45 R X |
| 2,502,815 | 4/1950 | Beebe | 294/81.56 X |
| 3,782,772 | 1/1974 | Cranston, III et al. | 294/81.56 |

*Primary Examiner*—Laramie E. Askin
*Attorney, Agent, or Firm*—Cushman, Darby & Cushman

[57] ABSTRACT

Apparatus for and a method of using a temporary transmission hot line crossarm to replace or repair an existing transmission hot line crossarm. The apparatus includes parts to support energized transmission line conductors and parts which support the apparatus. A boom with insulators and hooks attached supplies the mechanism to support the conductors and a lifting ring and sling supply support for the boom. The temporary transmission hot line crossarm enables repair work to be done without deenergizing the transmission lines.

8 Claims, 3 Drawing Sheets

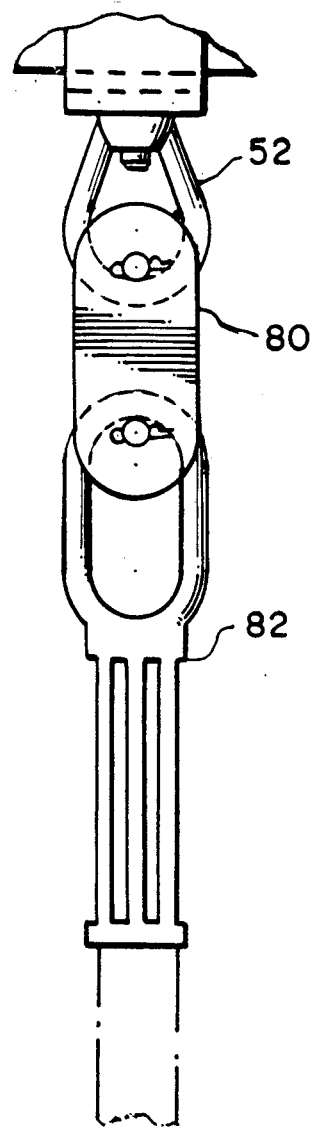
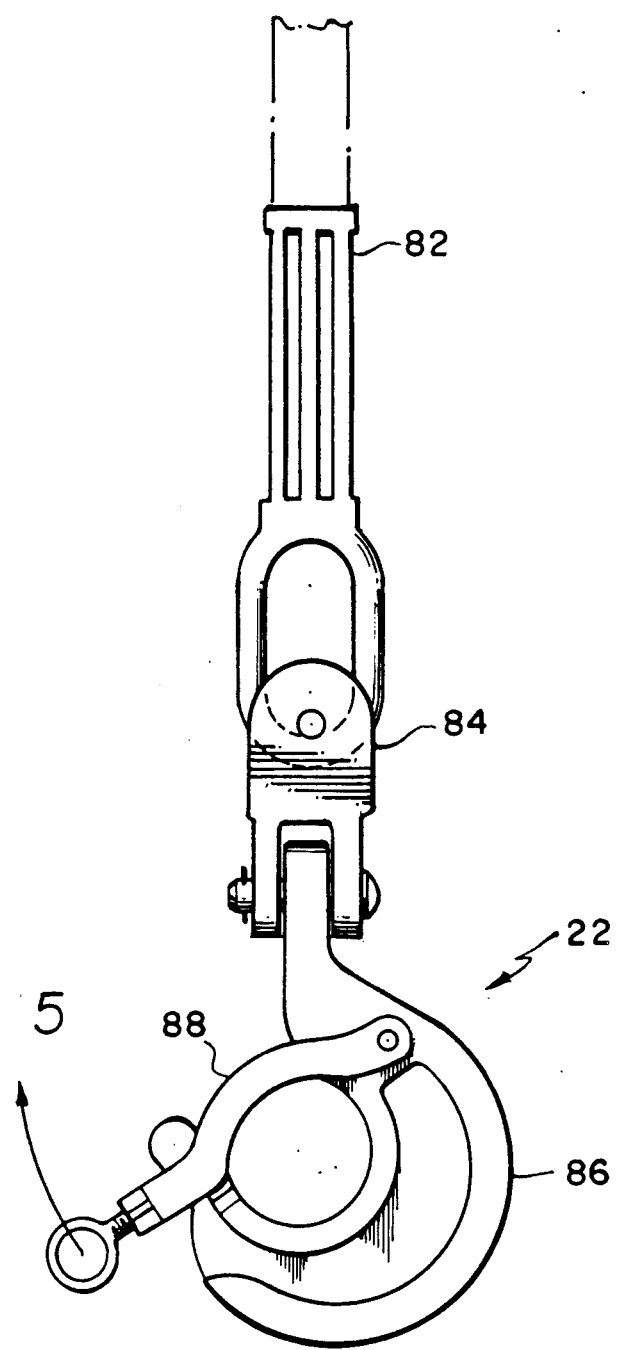
FIG. 4
FIG. 5

TEMPORARY TRANSMISSION HOT LINE CROSSARM AND METHOD OF REPLACING TRANSMISSION HOT LINE CROSSARMS

BACKGROUND OF THE INVENTION

1. Field of the Invention

This invention relates to an apparatus for temporarily supporting transmission line conductors while a new transmission hot line crossarm is installed and to a method of replacing such a crossarm while using the temporary apparatus.

2. Description of the Prior Art

As the demand in this country for electricity grows, the number of hot line crossarms in use has been growing at a staggering rate. The increase has caused a proportionate rise in the number of transmission hot line crossarms that need replacement. There has also been an increase in vandalism directed toward the public's transmission lines, necessitating frequent replacement of damaged transmission hot line crossarms or portions thereof. Also, as advancements have been made in crossarm material construction, it would be advantageous to replace existing wooden crossarms with more durable steel crossarms with attached insulators.

Because of the great number of crossarms that must be replaced annually, it is essential to be able to quickly and efficiently replace them. It is further desirable that power not be shut off during the replacement process, in order to avoid inconvenience to consumers. When the power is not shut off, it is necessary to provide protection for the linemen.

Previous methods for replacing crossarms involved three or more people using block and tackle equipment. Such methods required six sets of blocks to support the conductors while the crossarm is replaced. This was a laborious task and could be made even more hazardous by poor weather conditions.

SUMMARY OF THE INVENTION

In order to overcome the time-consuming, cumbersome block and tackle method of supporting the conductors, the present invention presents a quick and easy means for holding the conductors during crossarm replacement. More particularly, the present invention avoids the use of block and tackle equipment by requiring the use of only two insulated rods to help detach and attach the transmission lines from crossarm to temporary crossarm and back again. Further, the present invention supports the detached transmission lines while being maneuvered by a crane or some other device. In the preferred exemplary embodiment below, the temporary transmission hot line crossarm is shown as ready to be suspended from above by a crane.

Other objects, features, and characteristics of the present invention, as well as the methods of operation and functions of the related elements of the structure, and to the combination of parts and economics of manufacture, will become apparent upon consideration of the following description and the appended claims with reference to the accompanying drawings.

BRIEF DESCRIPTION OF THE DRAWING

FIG. 4 is a front elevational view of the boom attachment connection to the polymer insulator in accordance with the invention; and FIG. 5 is a front elevational view of the conductor/hook end of the polymer insulator of the invention.

DETAILED DESCRIPTION OF THE PRESENTLY PREFERRED EXEMPLARY EMBODIMENT

Figure 1:
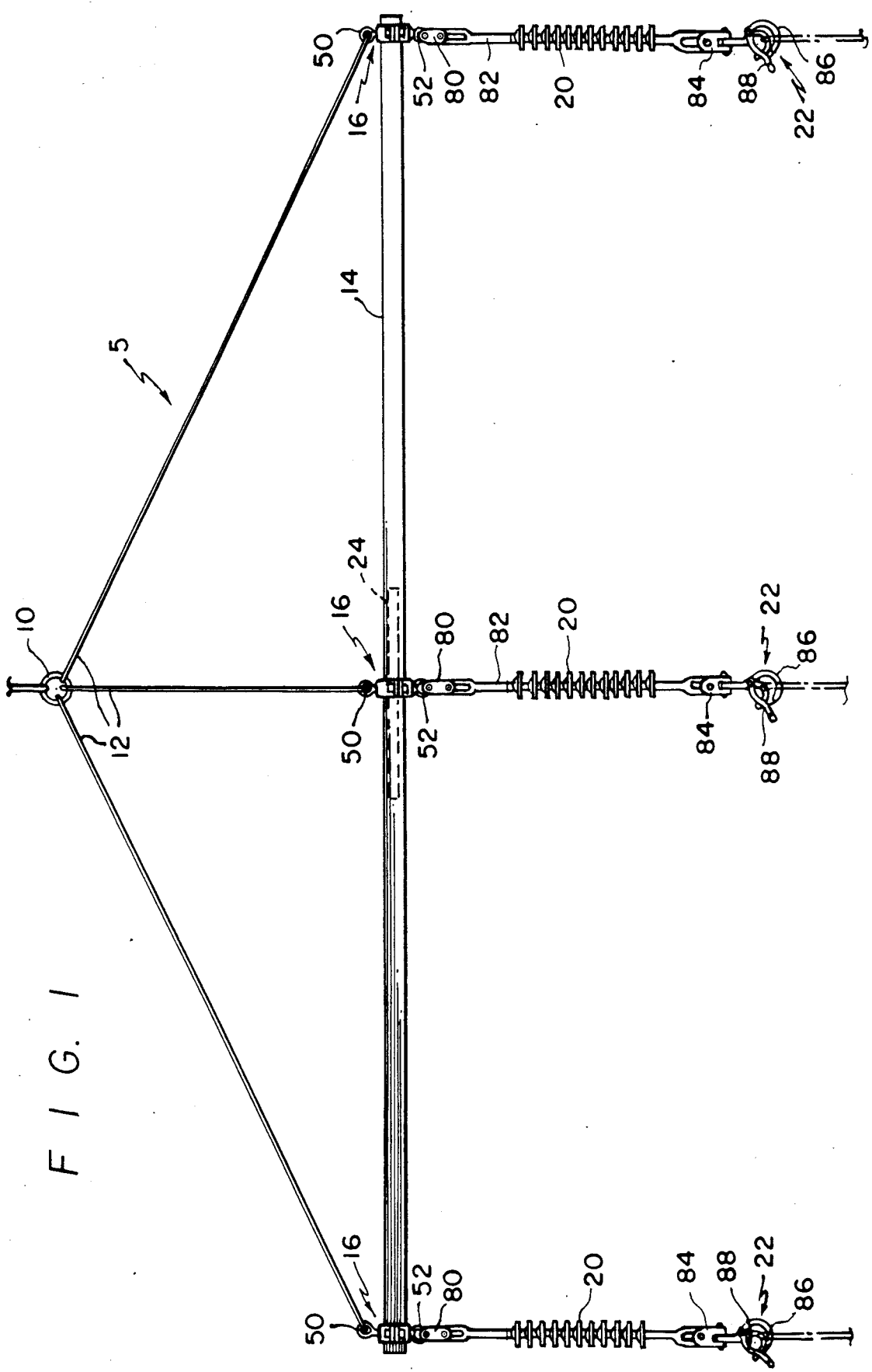
FIG. 1 is a front elevational view of the preferred embodiment of the present invention.

As shown in FIG. 1, the apparatus is generally indicated at 5 and is designed to accommodate three conductors. The present invention, however, is not limited to three conductors. The apparatus includes a fiberglass boom 14 from which supports for the transmission line conductors are attached. The boom 14 has been dielectrically tested for 100 KV per foot for five minutes. Boom 14 includes as many boom attachments 16 as there are conductors to support, with one attachment 16 being used for each conductor. A sling 12, made out of a non-conductive material such as nylon, is fastened to each attachment 16 and runs to a lifting ring 10 from which the entire crossarm assembly is supported. The lifting ring 10 is then in turn supported from above, according to one exemplary embodiment, by equipment such as a crane.

Figure 2:
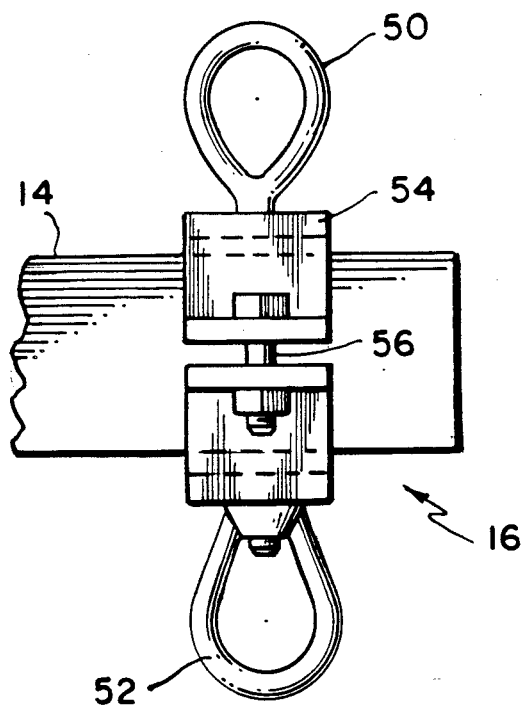
FIGS. 2 and 3 are front and side views, respectively, of an attachment member for use with the fiberglass boom of the invention.
Figure 3:
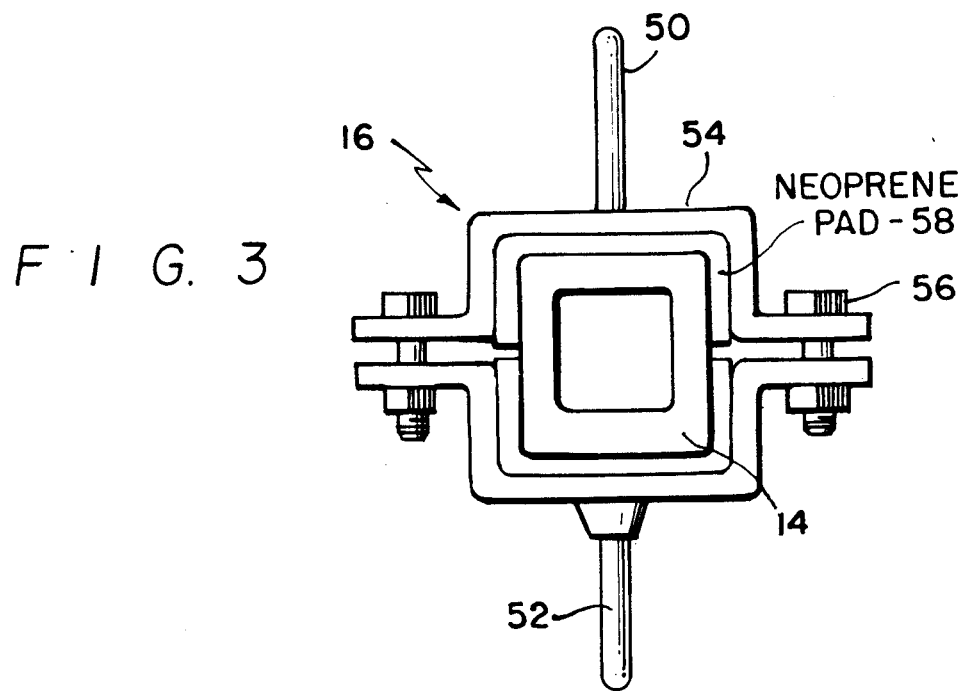

FIGS. 2 and 3 are detailed drawings of boom attachment 16. The side view permits the eyebolt 50 to be seen well. The sling 12, shown in FIG. 1, is attached to the eyebolt 50 of each boom attachment 16. The boom attachment 16 is held securely to the fiberglass boom 14 by any convenient means such as a tightened machine bolts 56 which force the metal reinforcement clamp 54 to firmly grasp the fiberglass boom 14. The boom attachments 16 are designed in the form of hollow rectangular sections, although the attachments could be different in section depending upon the shape of the boom 14. They also include a neoprene inner coating 58 that will act as a padding to prevent the metal bracket from damaging the fiberglass and serve to grip the boom 14 more securely.

An eyenut 52 protrudes from the bottom of the attachment 16. This eyenut is the preferred means by which a polymer insulator 20 is attached. Each insulator of the preferred embodiment is rated at either 230 KV or 115 KV.

FIG. 1 shows the entire system where the polymer insulators 20 are suspended from the boom attachment 16. FIGS. 4 and 5 provide a better view of the two ends of the chain-eye/chain-eye polymer insulator 82, called such because it is formed into eyes on both ends. Insulator 82 is attached to the eyenut 52 by a suitable connection link 80 which holds the pieces together. Insulator 82 is a fiberglass rod covered with a polymer coating to ensure that the conductor will not energize the support.

At the conducting end of the insulator 82, a hook, generally shown at 22, to hold the conductors is attached using a clevis-clevis (90°) 84 formed so as to successfully attach the hook 22 to the insulator 82. The hook 22 is made out of two aluminum pieces, a support hook 86 and a locking bolt 88. The conductor support hooks 86 are where the transmission conductors rest in the temporary transmission hot line crossarm. The locking bolt 88 closes the opening into support hook 86 and ensures that the conductor does not slip out. The conductor support hook 86 is the larger of the two pieces and is shaped in the form of a "J". Locking bolt 88 ensures that the conductor will not slip from the crook of the "J".

In the preferred embodiment, the boom 14 as pictured in FIG. 1 is forty feet long and can be separated into two twenty foot segments. The boom is internally reinforced in the center by a solid piece of fiberglass 24. The insert penetrates six feet into each twenty foot section bolted on each side with a ⅜ inch diameter bolt. The center boom attachment is the same size. The outer two halves just about one another. Though the fiberglass piece 24 is located internally in the center of the apparatus, there is no increase in the outside diameter where the boom is internally reinforced. The ability to separate the boom into two twenty foot segments assists in transporting the boom.

The use of the present invention eliminates considerable manpower and simplifies transmission hot line crossarm replacement. Once the transmission line conductors have been captured by the hooks 22, the weight of the conductors is supported by the apparatus 5 which can be raised by a crane attached to lifting ring 10. Raising the conductors in this manner allows the conductors to be handled as a group, being unclipped or uncoupled from the existing insulator strings. Once detached and held by the present invention, the conductors are lowered to gain electrical clearance, enabling work to be safely done above them. The conductors are now supported from the present invention while the existing crossarm is removed and a new crossarm is attached. When the new crossarm is in place, the present invention is again raised to the level of the insulators of the new crossarm so that the energized conductors may be attached to the newly installed crossarm.

To fully appreciate the ease with which the present invention allows work to be done on transmission line crossarms, one must understand the method of use of the present invention. For purposes of illustration, a crane will support the present invention. The crane is first secured to the temporary crossarm apparatus via the lifting ring 10. The present invention is then raised above the ground by raising the crane. When the temporary crossarm apparatus is at the proper height, the conductors to be supported are captured and secured in the hooks 22, more particularly, the conductors are rested in the conductor support hooks 86 and locked in place by the locking bolts 88 so that they do not fall out of the hooks 22.

Once the conductors are secured, the crane is raised so as to lift the conductors. Lifting the conductors removes the weight of the conductors from the existing insulators and therefore allows the conductors to be detached from the crossarm which is to be replaced. The next step is to lower the conductors in order to gain electrical clearance above them so that work may be done on the crossarm. Maintaining the conductors at the lowered height, the crossarm is either repaired or replaced.

After the required work has finished, the crane lifts the temporary crossarm to such a height that the conductors may be switched to their new homes on the new crossarm. Using insulated rods, long insulated rods operated from the ground, the conductors are removed one at a time from their respective hooks 22 and attached to their new insulated supports. After all the conductors have been tranferred from the temporary crossarm to the permanent crossarm, the crane is lowered thereby lowering the present invention. The temporary crossarm can then be disassembled so as to transport the device to the next site where such work is required.

While the present invention has been described in connection with what is presently considered to be the most practical and preferred embodiment, it is to be understood that the invention is not limited to the disclosed embodiment but, on the contrary, is intended to cover various modifications within the spirit and scope of the appended claims.

For example, as mentioned above, the apparatus may support any number of conductors and is not limited to only three. Rather, by moving the boom attachments 16 or adding more attachments, any number of conductors can theoretically be accommodated. Accordingly, the spacing of the conductors does not matter since the boom attachments 16 can be positioned on the boom 14 to satisfy any spacing of conductors. In the cases where the entire 40-foot length is not necessary, only one section of the boom can be used. A crane is not the only means to support a temporary transmission hot line crossarm. It is feasible for the invention to be supported from the bottom rather than from above.

The components of the present invention are not limited to those disclosed in this application. Rather, the materials used should have the same properties as the ones of the present invention. Therefore, persons of ordinary skill in this field are to understand that all such equivalent structures are to be included within the scope of the following claims.

What is claimed is:

1. A temporary hot transmission line crossarm assembly comprising:
   an elongated high voltage insulative boom member;
   a plurality of spaced-apart, flexible assemblies suspended from said boom member, each for holding an individual high voltage, energized transmission line; and
   means for suspending the elongated, insulative boom member from a remote device, said suspending means including a central lift member and a plurality of structural members extending between said central lift member and each of said plurality of spaced-apart flexible assemblies.

2. Apparatus as in claim 1, wherein each of said plurality of flexible assemblies comprises:
   a slidably movable attachment on said boom member; and
   grasping means attached to said slidably movable attachment for securely grasping the high voltage energized transmission line.

3. Apparatus as in claim 2, wherein each of said grasping means comprises:
   an insulative member pivotally attached to said slidably movable attachment, said insulative member having an upper and lower end; and
   a hook member suspended from the lower end of said insulative member for receiving and securing an energized transmission line therein.

4. Apparatus as in claim 3, wherein each said hook member comprises:
   an aluminum conductor support hook for receiving said energized transmission line; and
   a locking bolt for securing the energized transmission line in said support hook to prevent the energized transmission line from falling from said support hook.

5. Apparatus as claimed in claim 2, wherein said central lift member comprises a lifting ring for raising and lowering said apparatus, each of said structural members comprising a sling extending from said lifting ring to each of said slidably movable attachments.

6. Apparatus as in claim 5, wherein each sling is made of an insulating material.

7. Apparatus as in claim 1, wherein the insulated boom member comprises:
   a plurality of separate sections, each section having a hollow interior; and
   at least one section joining assembly to interconnect the plurality of separate sections together comprised of an insulative reinforcing member secured internally within each section adjacent a joint between juxtaposed sections and extending a predetermined distance into each of the sections being joined.

8. A method of working on a hot transmission line crossarm using a high voltage insulative temporary hot transmission line crossarm, said method comprising the steps of:
   fastening said temporary crossarm to a means for lifting said temporary crossarm to a desired height;
   capturing and supporting one or more high voltage, energized transmission lines in said temporary hot transmission line crossarm;
   raising and uncoupling the captured energized transmission lines from existing insulators of the hot transmission line crossarm;
   moving said energized transmission lines to gain necessary electrical clearance;
   undertaking desired work; and
   thereafter moving said temporary hot transmission line crossarm supporting the energized transmission lines to a desired level and reattaching the energized transmission lines.

* * * * *